AUTOMATIC FREQUENCY CONTROL SYSTEM

Original Filed May 19, 1942 2 SHEETS—SHEET 1

INVENTORS
EDWARD L. GINZTON
WILLIAM W. HANSEN
RUSSELL H. VARIAN
Paul B. Hunter
ATTORNEY Feb. 19, 1952 E. L. GINZTON ET AL 2,586,497

AUTOMATIC FREQUENCY CONTROL SYSTEM

Original Filed May 19, 1942

2 SHEETS—SHEET 2

INVENTORS
EDWARD L. GINZTON
WILLIAM W. HANSEN
RUSSELL H. VARIAN

Paul B. Hunter
ATTORNEY

Patented Feb. 19, 1952

2,586,497

UNITED STATES PATENT OFFICE 2,586,497

AUTOMATIC FREQUENCY CONTROL SYSTEM

Edward L. Ginzton, William W. Hansen, and Russell H. Varian, Garden City, N. Y., assignors to The Sperry Corporation, a corporation of Delaware Original application May 19, 1942, Serial No. 443,604. Divided and this application September 25, 1943, Serial No. 503,760

22 Claims. (Cl. 250—36)

This invention relates, generally, to transmitter circuits wherein means are provided for maintaining oscillators at a fixed operating frequency.

The present application is a division of our application Serial No. 443,604 filed May 19, 1942, now Patent No. 2,462,856, issued March 1, 1949, in the name of E. L. Ginzton, and claiming a part of the subject matter therein, and is a continuation in part of our application Serial No. 366,358, filed November 20, 1940, now Patent #2,294,942 issued September 8, 1942.

In the operation of transmitters, and specifically ultra high frequency transmitters, it is highly desirable that the transmitters be operated at as nearly fixed frequency as possible and that maximum output be maintained regardless of disturbing influences, such as changes in operating parameters.

One object of the present invention is to provide a transmitter structure employing an oscillator whose output frequency is maintained substantially constant.

Another object of the present invention is to provide an oscillator whose frequency is controlled from resonators operating at slightly different resonant frequencies above and below the operating frequency of the oscillator, respectively, or by a wave guide having cut-off frequency substantially at said operating frequency.

A further object is to provide, in conjunction with an oscillator employing cavity resonators, plunger or other movable means for varying the resonant frequency of said resonators and operated to maintain the oscillator at maximum output.

A still further object of the invention is to provide, in conjunction with an oscillator, band pass filter means for controlling the oscillator frequency.

Other objects and advantages will become apparent from the specification, taken in connection with the accompanying drawings wherein the invention is embodied in concrete form.

Figures 1, 2, 3, 4:
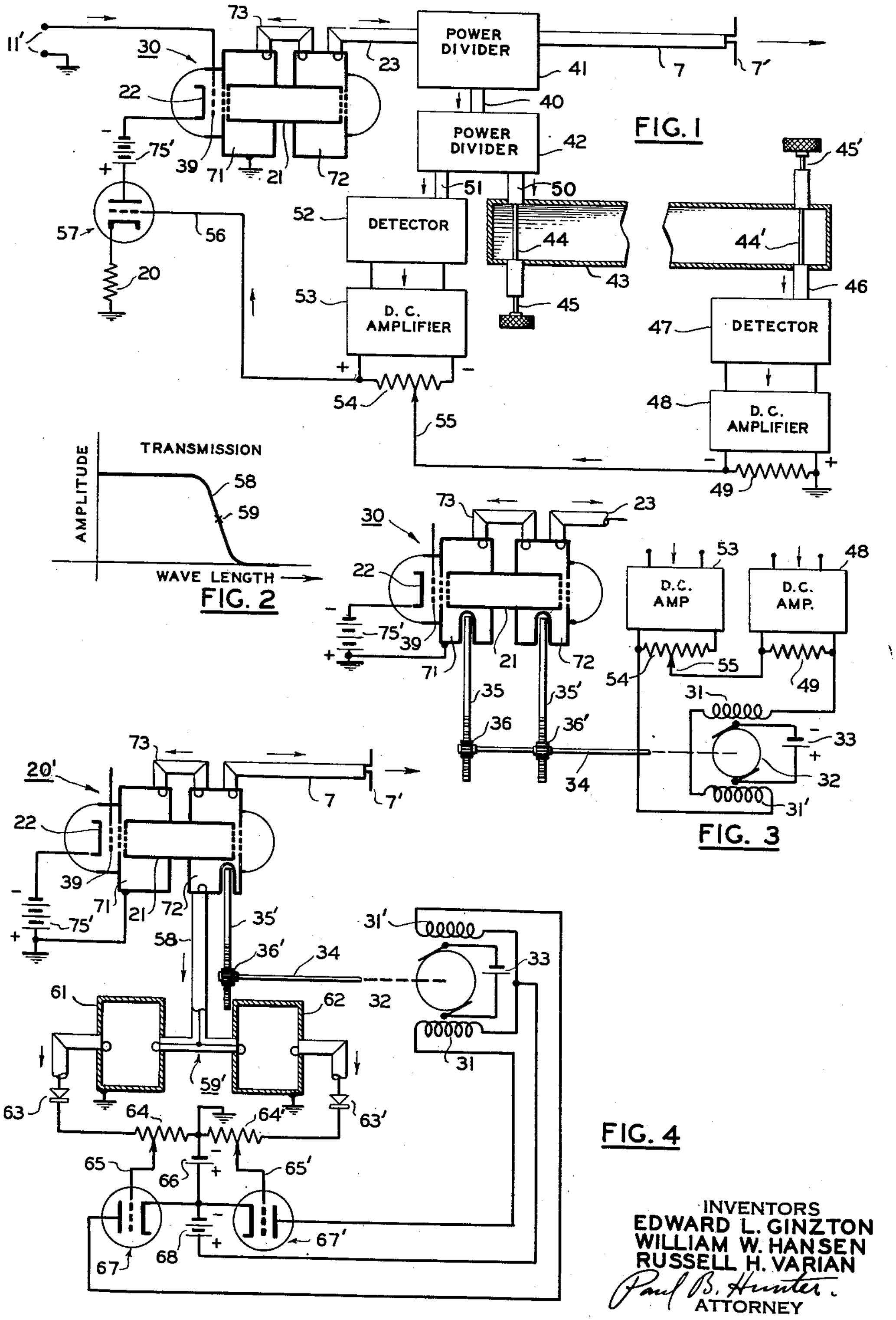
Fig. 1 is a wiring diagram illustrating an oscillator maintained at fixed frequency by use of a wave guide.
Fig. 2 is a graph explaining the operation of the structure of Fig. 1.
Fig. 3 is a modification of the structure shown in Fig. 1.
Fig. 4 is a wiring diagram illustrating an oscillator maintained at a fixed frequency by use of slightly differentially tuned resonators.

Referring now to Fig. 1, the reference numeral 30 designates an oscillator illustrated as a low power oscillator of the type disclosed in Patent No. 2,242,275, issued May 20, 1941, in the name of R. H. Varian, for Electrical Translating System and Method. Such an oscillator comprises a "buncher" resonator 71 and a "catcher" resonator 72, each having a pair of electron permeable walls or grids defining respective gaps across which electrons may be projected. These gaps are separated by a field-free drift space defined by a drift tube 21, and an electron beam is projected through these gaps and drift space from a cathode 22, by means of an accelerating voltage supplied from a battery 75′ shown arranged in series with the plate of triode 57 whose cathode is connected to ground through a biasing resistor 20. The output of the catcher resonator 72 of oscillator 30 is supplied by line 23 to a power divider 41 wherein a portion of the energy is tapped off by line 40 and the remainder is delivered through the line 7 to be radiated by the antenna 7′. This power divider 41 may be a simple T-junction in the concentric line 7 but is preferably a device of the type disclosed in the prior application Serial No. 429,508, for a High Frequency Power Measuring Device, filed February 4, 1942, by William W. Hansen et al., now abandoned, and in which a small arbitrarily chosen portion of the energy flowing through line 7 may be divided off to be supplied to concentric line 40. If desired the line 40 could be directly coupled as by a loose coupling to the resonator 72. Such a power divider may also be found in application Serial No. 118,298, filed September 28, 1949, for a High Frequency Energy Dividing Apparatus, by William W. Hansen. Application Serial No. 118,298 is a continuation-in-part of the aforementioned application Serial No. 429,508.

Line 40 supplies a second power divider 42 which may preferably divide its input energy into substantially equal halves, one half of which is supplied through the concentric line 50 to antenna 44 provided within a wave guide 43, the antenna 44 being matched to the guide 43 by use of the adjustable tuning plug 45. A similar antenna 44′ and tuning plug 45′ is located at the other end of the guide 43 and provides means to feed a coaxial line 46. The wave guide is proportioned so that its cut-off frequency is very closely adjacent to the desired frequency of operation of the oscillator 30. When the oscillator operates above this cut off frequency energy will pass down the wave guide 43 to line 46, but if the oscillator is operating below this cut off frequency no energy will pass down the wave guide. The relation between the transmission through the wave guide and the operating frequency is shown in Fig. 2. The line 46 supplies a detector 47 whose direct current output is amplified by an amplifier 48, the output of this amplifier being applied across a resistor 49.

Half of the energy supplied to line 40 is fed to a detector 52 by way of line 51 and thence into a direct current amplifier 53 whose output is applied across the tapped potentiometer 54. The voltages appearing across resistors 54 and 49 are connected so that they buck each other, the lower potential ends of these resistors being connected together. By adjustment of the tap 55 attenuation in the wave guide 43 or dissimilarity in the detectors or amplifiers can be compensated for. Should the frequency of oscillator 30 fall below the desired operating frequency the magnitude of the voltage supplied across resistor 49 will decrease resulting in an increase of the potential on the grid of tube 57, thereby decreasing the impedance of the tube and increasing the effective acceleration voltage of oscillator 30 and resulting in an increase of the operating frequency of the same. On the other hand, should the frequency of oscillator 30 increase above the desired value, the output of wave guide 43 will increase, thereby increasing the drop across resistor 49, lowering the potential of the grid of tube 57 and decreasing the accelerating voltage, thereby lowering the operating frequency. Thus the frequency of oscillation of this tube 30 is maintained substantially constant regardless of changes in its operating parameters.

Accordingly, it will be noted that discriminator means including for instance wave guide 43 are connected to direct current amplifying means, such as amplifier 48, 53, which provide an amplified version of a signal emanating from such discriminator means.

Fig. 2 shows the transmission through the wave guide 43 as a function of wavelength. The proper adjustment of the circuit constants is such that the tube operates in the vicinity of point 59 on this curve. Inasmuch as the curve of Fig. 2 is horizontal both above and below the desired operating frequency the apparatus of this invention can be made to hold the oscillator 30 at the frequency point 59 regardless of the extent of deviation in frequency above or below this point since the apparatus will always bring the operating frequency back to this point. Where it is desired to modulate the output of tube 30, leads 11′ connected between ground and a modulating grid 39 may be used. By supplying modulating potentials to leads 11′, the output of oscillator 30 is correspondingly amplitude modulated.

Where considerable frequency adjustments are desirable, it is preferable to use a tuning motor actuating tuning plugs 35, 35′ projecting into resonators 71 and 72 as shown in Fig. 3. Parts of this figure which are similar to parts of Fig. 1 are similarly numbered. It will be noted that the summation voltage across resistors 49 and 54 is used to energize the windings 31, 31′ of the motor, whose rotor 32 is supplied from a battery 33 and is connected to drive shaft 34 having pinions 36, 36′ thereon engaging the racks of plugs 35, 35′, which will effect the gang tuning of the oscillator 30.

In the structure shown in Fig. 4 an oscillator 20′ is shown maintained at a desired frequency through the use of resonators 61, 62 tuned respectively slightly above and below the desired operating frequency of the oscillator. The catcher resonator 72 of the oscillator 20′ supplies a small amount of energy through a connected line 58, which line is provided with a T-junction 59′, the ends of which are respectively coupled to resonators 61 and 62, these resonators being resonant to frequencies spaced by a small frequency interval on either side of the desired frequency of operation. The strength of the fields appearing in resonators 61 and 62 is then dependent upon the exact operating point of resonator 72 with reference to these resonators. The voltages built up across the resonators 61 and 62 are respectively detected by detectors 63, 63′ and placed in opposition across the potentiometers 64, 64′. The taps 65, 65′ of these potentiometers are connected to the grids of push-pull tubes 67, 67′ whose outputs are applied to the windings 31, 31′ of the tuning motor. The rotor 32 of this motor operates through shaft 34, pinion 36′, and plunger 35′ to tune the resonator 72.

Thus, any deviation of oscillator 20′ from its desired operating frequency results in a differential voltage between points 65 and 65′ causing an operation of tuning motor 32 and a readjustment of the frequency of the oscillator back to the desired value. In this way this oscillator may be made to continuously maintain its operating frequency and maximum output.

Figure 5:
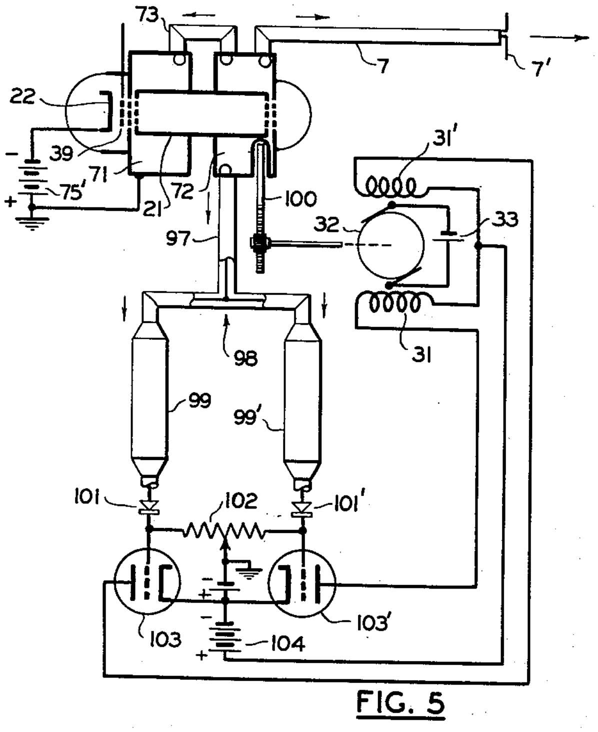
Fig. 5 illustrates an oscillator using band pass filters for controlling the frequency thereof.

In Fig. 5 there is shown a transmitter similar to that shown in Fig. 4 but instead of using hollow resonators for detecting frequency shifts, two band pass filters 99, 99′ are employed for this purpose. In this figure a portion of the energy from catcher resonator 72 is supplied through concentric line 97 to a T-junction 98 and from thence energy is fed substantially equally to two similar band pass filters 99, 99′. The outputs of these filters are detected by detectors 101, 101′, respectively, amplified by push-pull tubes 103, 103′, and caused to operate the motor 32 in opposite directions in the manner described in connection with Fig. 4. The motor 32 in this figure is shown tuning only the catcher resonator 72 but it is to be understood that this motor may also tune the buncher resonator 71 as is also true of Fig. 4, if desired.

Figure 6:
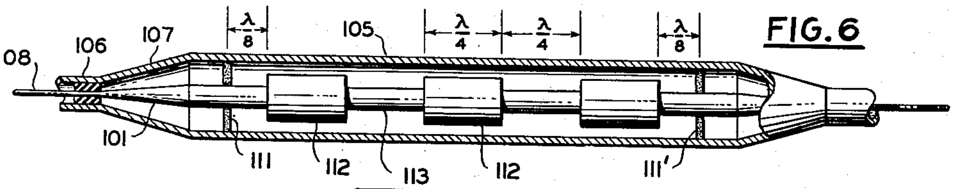
Fig. 6 is a longitudinal sectional view of one of the band pass filters used in Fig. 5.
Figure 3:
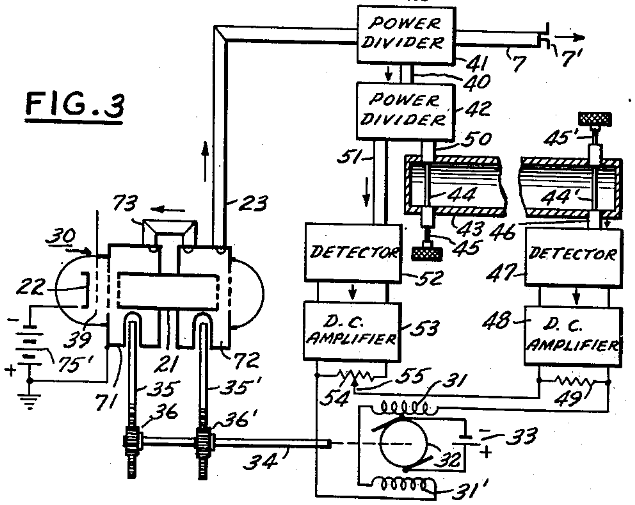

The detailed construction of band pass filters 99, 99′ of Fig. 5 is shown in Fig. 6. In this figure a concentric line member 106, 108 is attached to the expanding tapered concentric line members 107, 101 and then applied to the actual filter. The filter consists of an outer conducting tubular member 105 and an inner concentric conducting member made up of small and enlarged cylindrical sections 113, 112, respectively. As illustrated, each small and enlarged diameter section is made one-quarter wavelength long. At the entrance to the filter a terminating resistor 111 is provided one-eighth wave length from the first enlarged central conductor 112. The terminating resistor may be a thin carbon disc and a similar resistor 111′ is provided at the far end of the device. This device acts like a multi-section, T section, constant K filter whose band pass characteristic is similar to that shown in Fig. 7. Such filters, for low frequencies, are described in The Radio Engineering Handbook, edited by K. Henney, McGraw-Hill Book Company, New York, 1941, pages 169 and 170. The design and operation of such a band pass filter at ultra high frequencies is disclosed in copending application Serial No. 417,229 for High Frequency Tube Structure, filed October 31, 1941, now U. S. Patent No. 2,506,590, issued May 9, 1950, in the name of William W. Hansen, and also in copending application Serial No. 457,095 for High Frequency Filter Structure, filed September 2, 1942, in the name of William W. Hansen, issued April 6, 1948, as U. S. Patent No. 2,438,913, application Serial No. 457,095 being a division of application Serial No. 417,229. The band pass filter may be conveniently made 1 cm. wide at a wavelength of 10 cms.

Figure 7:
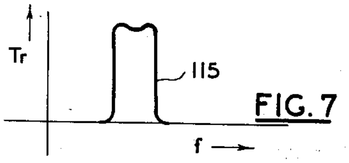
Figs. 7 to 9 are illustrative graphs.
Figure 8:
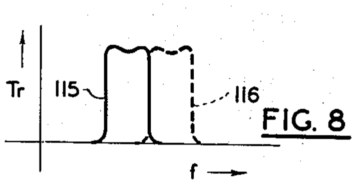
Figure 9:
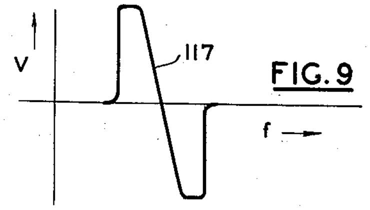

While filter 99 is chosen so as to have the characteristic indicated in Fig. 7 that of filter 99' is chosen to have the characteristic illustrated at 116 in Fig. 8. The output voltages of amplifiers 103, 103' is then like the curve of Fig. 9 having a straight portion 117 over which the device normally functions. These filters may be of Invar and may be temperature controlled.

It will be clear that the output voltages derived from across resistors 64 and 64' of Fig. 4, or resistor 102 of Fig. 5 could be used to control an amplifier tube similar to triode 57 of Fig. 1, connected in series with the accelerating battery 75' or 149 instead of controlling motor 32.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Means for maintaining a high frequency wave energy source at a desired operating frequency condition, comprising means for picking off a portion of the energy output of said source, frequency responsive means for receiving at least a part of said picked-off energy, said frequency responsive means comprising a wave guide having a cutoff frequency substantially at said desired operating frequency, a control circuit having a source of voltage connected in opposition to the output of said guide, and tuning means for said high frequency wave energy source responsive to the operation of said control circuit.

2. In apparatus for maintaining a device producing variable frequency electric energy at a desired operating frequency condition, means for tuning said device, and control means responsive to deviations of the output of said device from said desired frequency condition for automatically actuating said tuning means to reduce said deviation to a minimum, said control means comprising a wave guide section dimensioned for cut-off substantially at said desired frequency for detecting shifts in the output frequency of said device, and means connecting said wave guide section to actuate said tuning means.

3. High frequency apparatus comprising a high frequency oscillator having a pair of coupled cavity resonators, separated by a field free drift space, each of said resonators including a pair of electron permeable walls, and also having means including a cathode and a source of accelerating voltage for projecting an electron beam successively through said resonators by way of said electron-permeable walls to excite oscillations in the second of said resonators; an ultra high frequency discriminator connected to said second resonator and adapted to produce a reversible-polarity, variable-magnitude unidirectional voltage output corresponding in polarity and magnitude to the sense and amount of deviation of the output frequency of said oscillator from a predetermined value, said discriminator including a wave guide section dimensioned at cutoff at said predetermined value of said oscillator frequency and means responsive to said unidirectional voltage for controlling said accelerating voltage to restore said oscillator frequency to said predetermined value.

4. Apparatus as in claim 3, wherein said source of accelerating voltage comprises a source of fixed unidirectional voltage connected in series with the cathode of said oscillator and the anode-cathode circuit of an electron discharge device also having a control grid, and wherein said accelerating voltage controlling means comprises a connection between the output of said discriminator and said control grid.

5. High frequency apparatus comprising a high frequency oscillator having a cavity resonator and means for projecting an electron beam through said resonator to excite oscillations therein, said oscillator also including a frequency controlling electrode; ultra high frequency discriminator means connected to the output of said oscillator and adapted to produce an output signal corresponding to deviation of said oscillator frequency from a desired value, said discriminator means including a wave guide section dimensioned at cutoff at the desired value of said oscillator frequency and means connecting said discriminator output signal to said frequency-controlling electrode to maintain said oscillator frequency at said desired value.

6. High frequency apparatus comprising a high frequency oscillator having a cavity resonator and means including a source of accelerating voltage for projecting an electron beam through said resonator to excite oscillations therein, discriminator means connected to the output of said oscillator and adapted to produce a signal corresponding to deviation of the output frequency of said oscillator from a predetermined value, and direct current amplifier means connected to said discriminator means to provide an amplified version of said signal, for controlling said accelerating voltage to maintain said oscillator frequency at said desired value.

7. High frequency apparatus comprising a high frequency oscillator, including means for producing an electron beam, means for velocity modulating said electron beam, means providing a field-free drift space enclosing said velocity modulated beam, means for extracting energy from the beam passing through said drift space, and means for feeding back energy from said extracting means to said velocity modulating means; an ultra high frequency discriminator connected to said energy extracting means and adapted to produce a reversible-polarity, variable-magnitude, unidirectional voltage output corresponding in polarity and magnitude to the sense and amount of deviation of the output frequency of said oscillator from a predetermined value, direct current amplifier means connected to said discriminator to provide an amplified version of said unidirectional voltage output, and means including an electron discharge device responsive to said amplified version of said unidirectional voltage for controlling said beam-producing means to restore said oscillator frequency to said predetermined value.

8. High frequency apparatus comprising a high frequency oscillator, including means for producing an electron beam, means for velocity modulating said electron beam, means providing a field-free drift space enclosing said velocity-modulated beam, means for extracting energy from the beam passing through said drift space, and means for feeding back energy from said extracting means to said velocity modulating means; means connected to the output of said oscillator and adapted to produce a signal corresponding to deviation of the output frequency of said oscillator from a predetermined value, and means responsive to said signal for controlling said beam-producing means to maintain said oscillator frequency at said predetermined value, said means for controlling said beam-producing means including an electron discharge device having a grid, said grid being connected to receive said signal.

9. High frequency apparatus comprising a high frequency oscillator having a cavity resonator and means for producing and projecting an electron beam through said resonator to excite oscillations therein, discriminator means connected to the output of said oscillator and adapted to produce a signal corresponding to deviation of the output frequency of said oscillator for a predetermined value, said discriminator means including a wave guide section dimensioned at cutoff at the predetermined value of the output frequency of said oscillator, and means responsive to said signal for controlling said beam-producing and projecting means to maintain said oscillator frequency at said predetermined value.

10. High frequency apparatus comprising a high frequency oscillator having a cavity resonator and means for producing and projecting an electron beam through said resonator and to excite oscillations therein, and means responsive to deviation of the output frequency of said oscillator from a predetermined value for controlling said beam-producing and projecting means to maintain said oscillator frequency at said predetermined value.

11. High frequency apparatus as defined in claim 10 wherein said high frequency oscillator comprises a velocity modulation vacuum tube and wherein said beam-producing and projecting means comprises an electrode in said velocity modulation tube, said means for controlling said beam-producing and projecting means including means connected to said electrode for varying the potential thereof and thereby varying the velocity of said electron beam in response to variations of output frequency of said oscillator from said predetermined value.

12. High frequency apparatus as defined in claim 11 wherein said electrode comprises the cathode of said velocity modulation vacuum tube.

13. High frequency apparatus as defined in claim 10, wherein said high frequency oscillator includes a cathode electrode and at least one further electrode in said electron beam-producing and projecting means, said means responsive to deviation of the output frequency of said oscillator from a predetermined value for controlling said beam-producing and projecting means comprising means for providing a variable unidirectional voltage between said cathode electrode and said further electrode.

14. An ultra high frequency automatic frequency control apparatus, comprising an ultra high frequency electron discharge device having a pair of cavity resonators and means for projecting an electron beam successively therethrough, a pair of circuits, one of said circuits including a wave guide dimensioned at cut-off substantially at the desired operating frequency of said device and the other of said circuits being substantially frequency-insensitive, means for supplying energy to said circuits from one of said resonators, and means responsive to the differential output of said circuits for tuning at least one of said resonators into resonance with the frequency of said energy.

15. Automatic frequency control apparatus for a source of ultra-high-frequency wave energy having a frequency-determining element and tuning means for actuating said element, said apparatus comprising a pair of circuits for receiving separate parts of the energy output of said source, one of said circuits including substantially frequency-insensitive detector means for producing a voltage output, the other of said circuits including a wave guide section dimensioned at cutoff at substantially the desired operating frequency value of said source, means for producing a rectified version of the output of said wave guide section, means combining said rectified wave guide output and said voltage output to derive a control voltage proportional to deviation of the operating frequency of said source from said desired operating frequency value, and means for applying said control voltage to said tuning means to restore said operating frequency to said desired operating frequency value.

16. Ultra-high-frequency apparatus comprising a source of high-frequency wave energy having a frequency-determining element; tuning means for actuating said element; and control means for automatically actuating said tuning means to maintain the output of said source at a desired frequency value, said control means comprising means for picking-off a portion of the energy output of said source, a substantially frequency-insensitive detector circuit for receiving a part of said picked-off energy and for producing a voltage output, a wave guide section having a cutoff dimension at substantially said desired operating frequency value and adapted to receive another part of said picked-off energy, means combining a rectified version of the output of said wave guide and said voltage output to derive a control voltage proportional to deviation of the operating frequency of said source from said desired operating frequency value, and means for applying said control voltage to said tuning means to restore said operating frequency to said desired operating frequency value.

17. Apparatus for automatically controlling the frequency of a device producing ultra-high-frequency energy comprising means for tuning said device, means coupled to said device for detecting the output thereof, said detecting means comprising a network having a frequency-insensitive branch and a high-pass-filter branch, said high-pass-filter branch comprising a wave guide section having a cutoff frequency substantially at the desired operating frequency of said device, means combining the outputs of said branches to produce a control signal, and means responsive to said control signal for controlling said tuning means.

18. The apparatus defined in claim 17, wherein means are provided for conjointly coupling said branches to said device for receiving equal portions of said device output.

19. The apparatus defined in claim 17 wherein said combining means combines the outputs of said branches in opposition.

20. Ultra-high-frequency apparatus comprising a pair of circuits having a common input connection adapted to receive separate parts of an input signal applied at said common connection, one of said circuits including substantially frequency-insensitive detector means for producing a voltage output, the other of said circuits including a wave guide section dimensioned at cut-off at a predetermined frequency value and, means for producing a rectified version of the output of said wave guide, and means combining said rectified wave guide output and said voltage output in opposition to provide an output signal representing deviations of said input signal from said predetermined frequency.

21. Automatic frequency control apparatus for an ultra-high-frequency generator having a frequency-determining element and a tuner for controlling the element, said apparatus comprising a pair of circuits connected to receive separate parts of a portion of the output energy of the generator, one of said circuits including a substantially frequency-insensitive detector for producing a first voltage output, the other of said circuits including a wave guide section dimensioned at cutoff at substantially the desired operating frequency of the generator, a detector connected to receive the output of said wave guide section for producing a second voltage output, a differential circuit connected to receive said first and second voltages in opposition and for producing an output control voltage corresponding in sense and magnitude to the sense and amount of deviation of the frequency of said generator from the desired operating frequency and apparatus interposed between said differential circuit and the tuner and responsive to said control voltage for operating said tuner to maintain the desired operating frequency of said generator.

22. Apparatus as in claim 21, wherein a power divider is connected to receive a portion of the energy of the generator and deliver energy separately to each of said pair of circuits, said divider being characterized by substantially equal energy outputs.

EDWARD L. GINZTON.
WILLIAM W. HANSEN.
RUSSELL H. VARIAN.

REFERENCES CITED

The following references are of record in the file of this patent:

UNITED STATES PATENTS

| Number | Name | Date |
|---|---|---|
| 1,626,724 | Demarest | May 3, 1927 |
| 1,663,086 | Long | Mar. 20, 1928 |
| 2,017,894 | Cady | Oct. 22, 1935 |
| 2,077,314 | Eberhard | Apr. 13, 1937 |
| 2,106,768 | Southworth | Feb. 1, 1938 |
| 2,138,747 | Robinson | Nov. 29, 1938 |
| 2,220,922 | Trevor | Nov. 12, 1940 |
| 2,243,202 | Fritz | May 27, 1941 |
| 2,245,627 | Varian | June 17, 1941 |
| 2,261,130 | Applegate | Nov. 4, 1941 |
| 2,280,824 | Hansen | Apr. 28, 1942 |
| 2,281,935 | Hansen | May 5, 1942 |
| 2,294,942 | Varian et al. | Sept. 8, 1942 |
| 2,297,800 | Read | Oct. 6, 1942 |
| 2,323,201 | Carter | June 29, 1943 |
| 2,337,214 | Tunick | Dec. 21, 1943 |
| 2,374,810 | Fremlin | May 1, 1945 |
| 2,406,850 | Pierce | Sept. 3, 1946 |